United States Patent
Gaither et al.

(10) Patent No.: US 6,813,691 B2
(45) Date of Patent: Nov. 2, 2004

(54) COMPUTER PERFORMANCE IMPROVEMENT BY ADJUSTING A COUNT USED FOR PREEMPTIVE EVICTION OF CACHE ENTRIES

(75) Inventors: Blaine D. Gaither, Fort Collins, CO (US); Benjamin D. Osecky, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 405 days.

(21) Appl. No.: 10/001,584

(22) Filed: Oct. 31, 2001

(65) Prior Publication Data

US 2003/0084248 A1 May 1, 2003

(51) Int. Cl.$^7$ .............................................. G06F 12/00
(52) U.S. Cl. ........................ 711/133; 711/159; 707/2; 714/47
(58) Field of Search ............................ 707/2; 711/133, 711/134, 135, 136, 154, 156, 159; 714/47

(56) References Cited

U.S. PATENT DOCUMENTS

| | | | | |
|---|---|---|---|---|
| 6,026,475 A | * | 2/2000 | Woodman ................... | 711/202 |
| 6,134,634 A | | 10/2000 | Marshall, Jr. et al. ...... | 711/143 |
| 6,425,057 B1 | * | 7/2002 | Cherkasova et al. ........ | 711/134 |
| 6,490,671 B1 | * | 12/2002 | Frank et al. ................. | 711/207 |
| 6,493,801 B2 | * | 12/2002 | Steely et al. ................. | 711/135 |
| 6,542,861 B1 | * | 4/2003 | Lyles et al. ................... | 703/21 |
| 6,678,794 B1 | * | 1/2004 | Talyansky et al. .......... | 711/135 |
| 2002/0078303 A1 | * | 6/2002 | Rozario et al. ............. | 711/133 |

OTHER PUBLICATIONS

"Limiting The Number Of Dirty Entries In A Computer Cache"; Filed Oct. 31, 2001; application No. 10/004,193; Applicant: Blaine D. Gaither et al; Hewlett–Packard Company.

* cited by examiner

*Primary Examiner*—Donald Sparks
*Assistant Examiner*—Christian P. Chace
(74) *Attorney, Agent, or Firm*—Augustus W. Winfield

(57) ABSTRACT

A cache system improves performance by limiting the number of dirty entries in a cache. The cache system may be further improve performance by limiting the number of dirty entries in a cache that might be subject to a cache-to-cache transfer. In a first example, a cache system counts the total number of dirty entries in the cache and preemptively evicts at least one dirty entry when the count exceeds a predetermined threshold. In a variation, a cache system counts dirty cache entries that result from a cache-to-cache transfer, and evicts at least one dirty entry that results from a cache-to-cache transfer when the number exceeds a predetermined threshold. For either system, the predetermined threshold may be dynamically varied to determine a value that optimizes performance.

2 Claims, 8 Drawing Sheets

COMPUTER PERFORMANCE IMPROVEMENT BY ADJUSTING A COUNT USED FOR PREEMPTIVE EVICTION OF CACHE ENTRIES

FIELD OF INVENTION

This invention relates generally to computer systems and more specifically to cache memory systems.

BACKGROUND OF THE INVENTION

Most computer systems employ a multilevel hierarchy of memory systems, with relatively fast, expensive, limited-capacity memory at the highest level of the hierarchy and proceeding to relatively slower, lower cost, higher-pacity memory at the lowest level of the hierarchy. Typically, the hierarchy includes a small fast memory called a cache, either physically integrated within a processor integrated circuit, or mounted physically close to the processor for speed. There may be separate instruction caches and data caches. There may be multiple levels of caches. Many computer systems employ multiple processors, each of which may have multiple levels of caches. Some caches may be shared by multiple processors. All processors and caches may share a common main memory.

Typically, a memory is organized into words (for example, 32 bits or 64 bits per word). Typically, the minimum amount of memory that can be transferred between a cache and a next lower level of the memory hierarchy is called a line, or sometimes a block. A line is typically multiple words (for example, 16 words per line). Memory may also be divided into pages (also called segments), with many lines per page. In some systems, page size may be variable. The present patent document uses the term "line" for a cache entry, but the invention is equally applicable to blocks or other memory organizations.

Many computer systems employ multiple processors, each of which may have multiple levels of caches. Some caches may be shared by multiple processors. All processors and caches may share a common main memory. A particular line may simultaneously exist in memory and in the cache hierarchies for multiple processors. All copies of a line in the caches must be identical, a property called coherency. The protocols for maintaining coherence for multiple processors are called cache coherence protocols.

To improve performance, the computer system tries to keep data that will be used soon in the fastest memory, which is usually a cache high in the hierarchy. Typically, when a processor requests a line, if the line is not in a cache for the processor (cache miss), then the line is copied from main memory, or from a cache of another processor. A line from main memory, or a line from another processor's cache, is also typically copied into a cache for the requesting processor, assuming that the line will need to be accessed again soon. If a cache is full, then a new line must replace some existing line in the cache. If a line to be replaced is clean (the copy in cache is identical to the copy in main memory), it may be simply overwritten. If a line to be replaced is dirty (the copy in cache is different than the copy in main memory), then the line must be evicted (copied to main memory). A replacement algorithm is used to determine which line in the cache is replaced. A common replacement algorithm is to replace the least-recently-used line in the cache.

One particular performance concern for large multiple processor systems is the impact on latency when one processor requests a line that is cached by another processor. If a modified (dirty) line is cached by a first processor, and the line is requested by a second processor, the line is written to main memory, and is also transferred to the requesting cache (called a cache-to-cache transfer). For a large multiple-processor system, a cache-to-cache transfer may require a longer latency than a transfer from main memory. In addition, for a large multiple-processor system, a cache-to-cache transfer may generate traffic on local buses that would not be required for a transfer from main memory. Accordingly, there is a need to improve performance by reducing the average latency, which can be improved by reducing the number of cache-to-cache transfers.

Performance is particularly affected by thrashing, where a line is transferred from a first cache to a second cache, and then subsequently requested by the first cache (or some other cache). There is a need to improve performance by reducing thrashing.

Systems for determining the age of dirty lines are known. For example, U.S. Pat. No. 6,134,634 describes a system in which each line in a cache has an associated counter that is used to count cycles during which the line has not been written. If the count exceeds a predetermined number, the line is determined to be stale and may be evicted. There is a need for a lower cost system for preemptive eviction.

SUMMARY OF THE INVENTION

Cache-to-cache transfers are reduced by limiting the number of dirty entries in a cache. Cache-to-cache transfers may be further reduced by limiting the number of dirty entries in a cache that might be subject to a cache-to-cache transfer. In a first example embodiment of the invention, a cache system counts the total number of dirty entries in the cache. In a variation, the cache system counts the total number of dirty entries in the cache that result from a cache-to-cache transfer. In each embodiment, when the number exceeds a predetermined threshold, at least one dirty entry is preemptively evicted. For each embodiment, the threshold may optionally be dynamically optimized by an operating system.

DETAILED DESCRIPTION OF THE PREFERRED EMBODIMENT OF THE INVENTION

Cache coherence protocols commonly place each cached line into one of multiple states. One common approach uses three possible states for each line in a cache. Before any lines are placed into the cache, all entries are at a default state called "Invalid". When a previously uncached physical line is placed into the cache, the state of the entry in the cache is changed from Invalid to "Shared". If a line is modified in a cache, it may also be immediately modified in memory (called write through). Alternatively, a cache may write a modified line to memory only when the modified line in the cache is invalidated or replaced (called write back). For a write-back cache, when a line in the cache is modified, or will be modified, the state of the entry in the cache is changed to "Modified". The three-state assignment just described is sometimes called a MSI protocol, referring to the first letter of each of the three states. In a common variation, a fourth state called "Exclusive" is added, and the resulting protocol is called MESI. There are many variations of coherence protocols, but in general, it is common to have a "Modified" state or its equivalent.

In a cache hierarchy, each cache level is typically inclusive of all higher level caches. That is, an entry at one level is included in all caches at lower levels. Typically, only the highest level cache can modify a cache entry. When a modified entry is evicted, it is typically written to memory from the lowest level cache, and higher level caches simply invalidate their copy of the evicted entry. Eviction takes time and consumes bandwidth.

Figure 1:
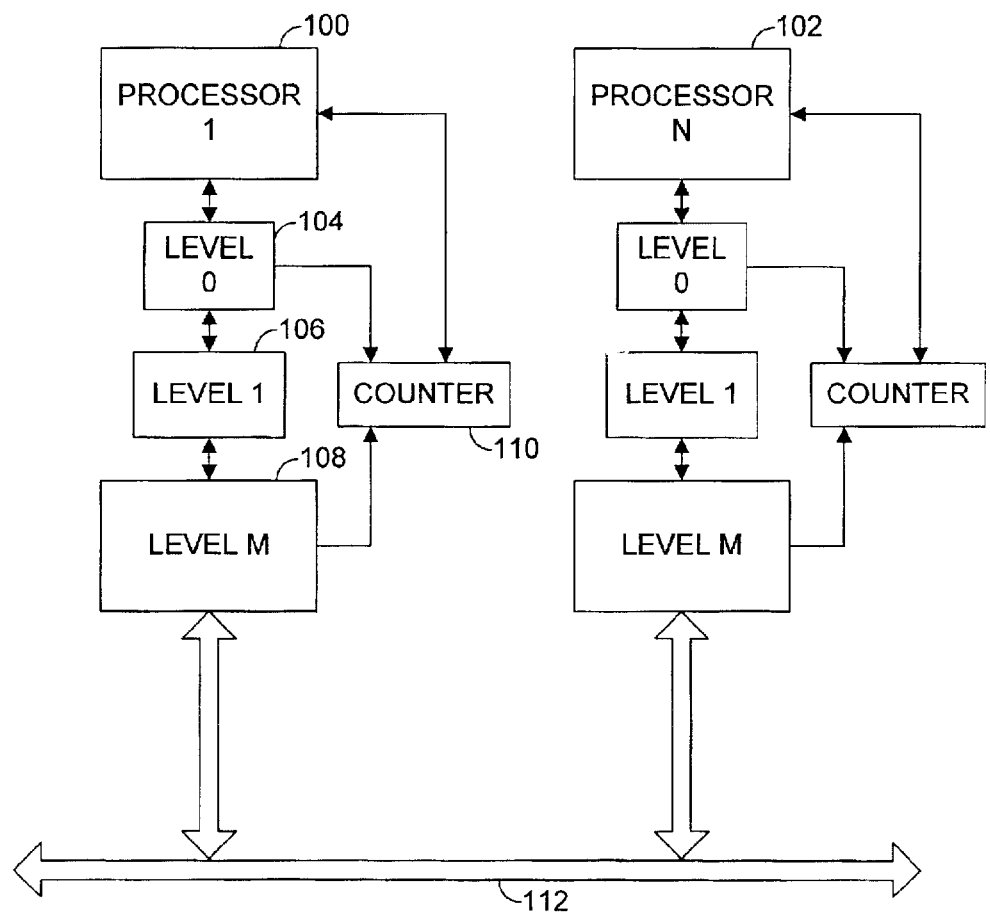
FIG. 1 is a block diagram of an example system that includes the invention.

FIG. 1 illustrates an example computer system in which the invention may be implemented. In FIG. 1, two of N processors (100 and 102) are interconnected by a bus (or switch, or fabric) 112. Processor 100 has M+1 levels of cache (104, 106, and 108). The number of processors, number of cache levels, and organization of the caches is not important for the invention. A counter, 110, can be read and reset by processor 100. In a first example embodiment, the counter 10 is incremented each time an entry in the top level cache (104 in the example of FIG. 1) transitions to the coherence state of Modified (or an equivalent state). In the first example embodiment, the counter 110 is decremented each time a modified entry is evicted from the lowest level cache (108 in the example of FIG. 1).

If the counter exceeds a predetermined threshold, then at least one dirty (modified) entry is preemptively evicted. In a fully associative cache, a replacement algorithm may be used to identify one particular entry to be preemptively evicted, for example, the least-recently-used dirty entry. For a set associative cache, the system may arbitrarily choose any dirty entry to preemptively evict. For example, a set counter may be used to incrementally cycle through each set (index), and the first dirty entry encountered in a set corresponding to the set counter may be preemptively evicted.

In an inclusive cache hierarchy, only the highest level cache can modify a line, and each lower level cache includes all lines from each cache having a higher level. Accordingly, in an inclusive cache hierarchy, a count of transitions to the Modified state in the highest level cache is a count of transitions to the Modified state in every cache in the hierarchy. In contrast, a line may be evicted from a high level cache, but not be evicted from the lowest level cache. Accordingly, the value of the counter may be viewed as a count of the dirty lines in the lowest level cache (108 in the example of FIG. 1).

As an alternative, for example if the cache hierarchy is not inclusive, each cache at each level of the hierarchy may have a separate counter. Each counter may be incremented each time an entry in the corresponding cache level transitions to the state of Modified, and the counter may be decremented each time a modified entry in the corresponding cache level is evicted. When any of the counters exceeds a predetermined threshold, at least one dirty entry is preemptively evicted from the corresponding cache level.

Figure 2A:
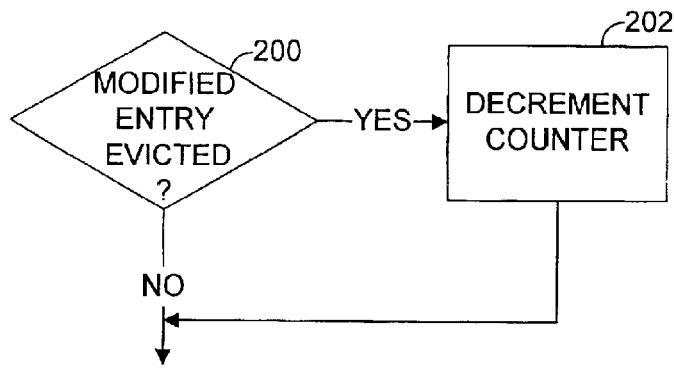
FIGS. 2A and 2B are flow charts of example event driven processes in accordance with the example system of FIG. 1.
Figure 2B:
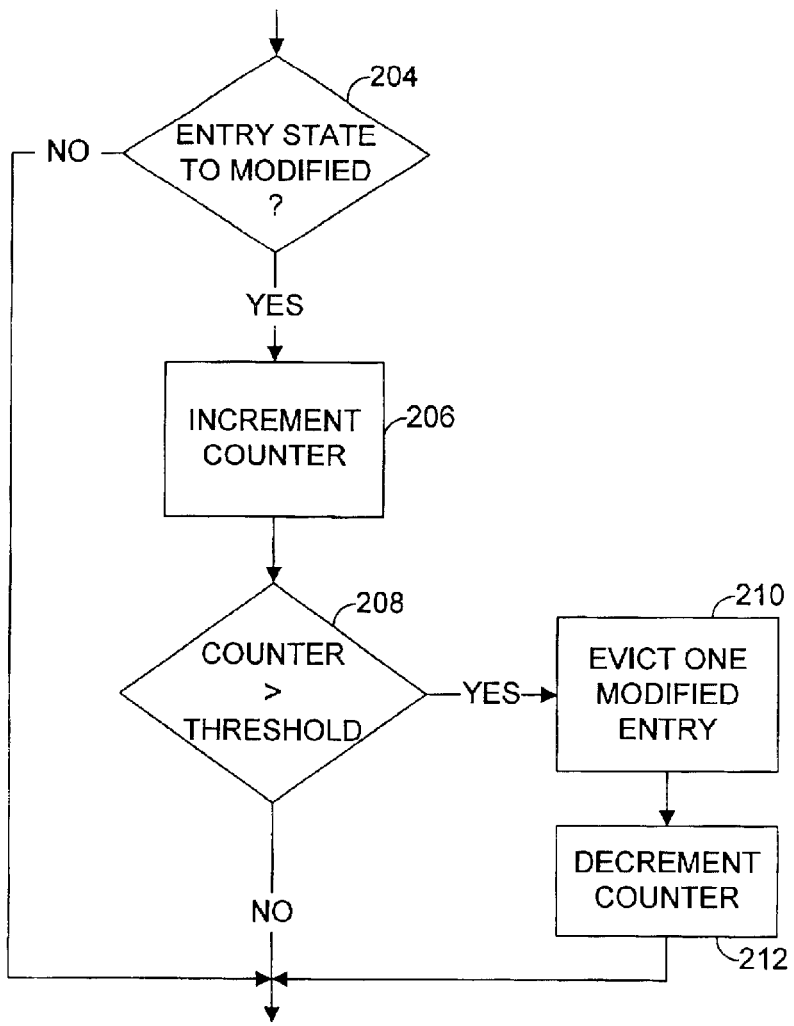

FIGS. 2A and 2B illustrate example event driven processes for a system as in FIG. 1. The processes illustrated in FIGS. 2A and 2B are time independent. In FIG. 2A, if a modified entry is evicted (step 200), then a counter is decremented (step 202). In FIG. 2B, if an entry transitions to the Modified state (or equivalent) (step 204), then the counter is incremented (step 206). If the counter exceeds a threshold (step 208), then at least one modified entry is preemptively evicted (step 210), and the counter is decremented (step 212). Alternatively, as discussed above, each cache at each level of the hierarchy may have a separate counter.

In the first example embodiment described above, cache-to-cache transfers are indirectly reduced by limiting the total number of dirty lines in a cache hierarchy. Each dirty line may potentially be requested by another cache, causing a cache-to-cache transfer. However, not all dirty lines are subject to a cache-to-cache transfer. In a second example embodiment, illustrated in FIG. 3, the system is improved to limit the total number of dirty lines that have actually been subject to a cache-to-cache transfer. Preemptive eviction of dirty lines that have already been subject to a cache-to-cache transfer reduces thrashing.

Figure 3:
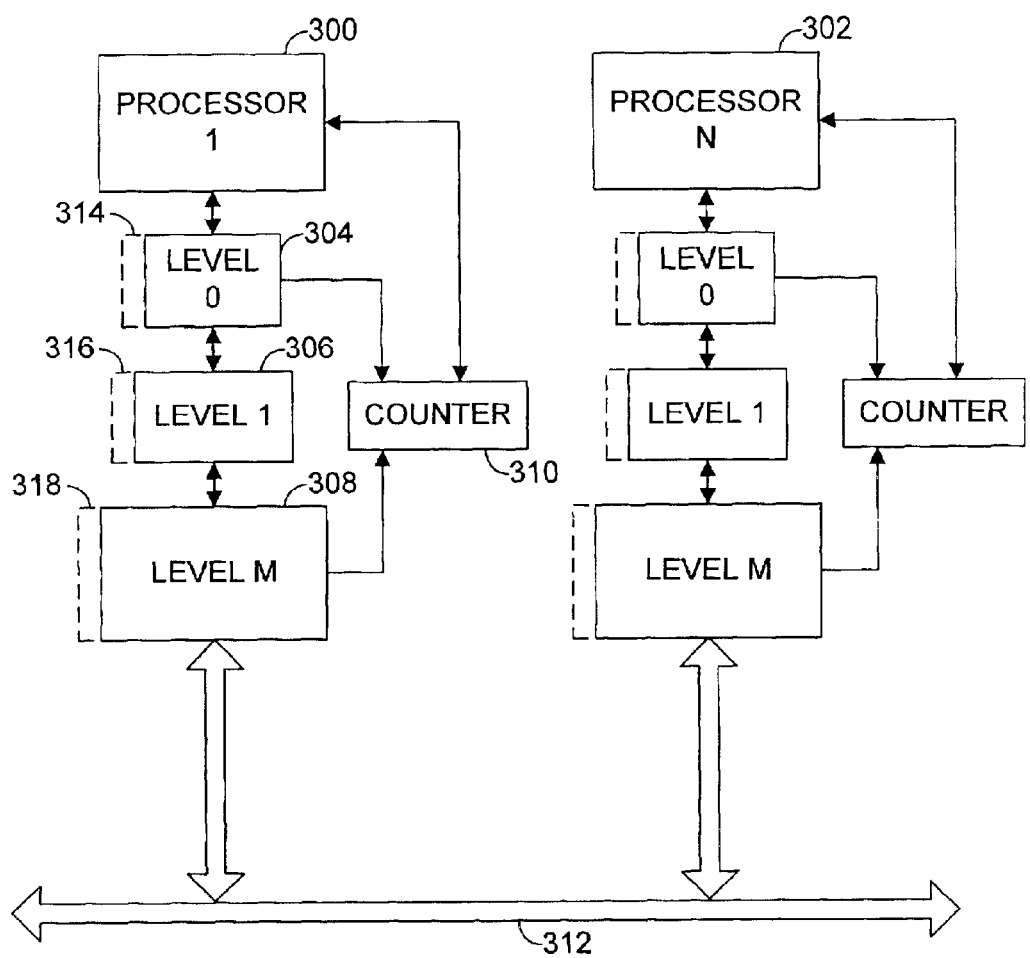
FIG. 3 is a block diagram of a second example system that includes the invention.

In FIG. 3, two of N processors (300 and 302) are interconnected by a bus (or switch, or fabric) 312. Processor 300 has a cache hierarchy with M+1 levels (304, 306, and 308). The number of processors, number of cache levels, and organization of the caches is not important for the invention. A counter, 310, can be read and reset by processor 300. Each entry (or each index in a set associative cache) in each cache has an additional bit of coherence information (indicated by 314, 316, 318), indicating whether the entry (or at least one entry in a set) was transferred from another cache hierarchy. It is known for multiprocessor systems to provide a signal that indicates that a request for data for one processor is being serviced from a cache for another processor (a cache-to-cache transfer). That is, the transferring processor asserts the signal to indicate that it is providing the requested data from its cache, and that main memory should not respond. In one commercially available processor architecture, the signal is called "HITM#". The following discussion assumes that the system in FIG. 3 includes a signal that indicates a cache-to-cache transfer. When a cache-to-cache transfer is added to a cache, the corresponding bit (314, 316, 318) for the entry is set to a state identifying the entry as a cache-to-cache transfer.

Counter 310 is incremented each time a cache-to-cache transfer entry in the highest level cache (cache 304 in FIG. 3) transitions to the state of Modified (or an equivalent state). Counter 310 is decremented each time a dirty (modified) cache-to-cache transfer entry is evicted from the lowest level cache (cache 308 in FIG. 3). When the count in counter 310 exceeds a predetermined threshold, one dirty cache-to-cache transfer entry is preemptively evicted. In a fully associative cache, a replacement algorithm may be used to identify one particular entry to be preemptively evicted, for example, the least-recently-used dirty cache-to-cache transfer entry. For a set associative cache, the system may arbitrarily choose any dirty cache-to-cache transfer entry to preemptively evict. For example, a set counter may be used to incrementally cycle through each set (index), and the first dirty cache-to-cache transfer entry encountered in a set corresponding to the set counter may be preemptively evicted.

Figure 4A:
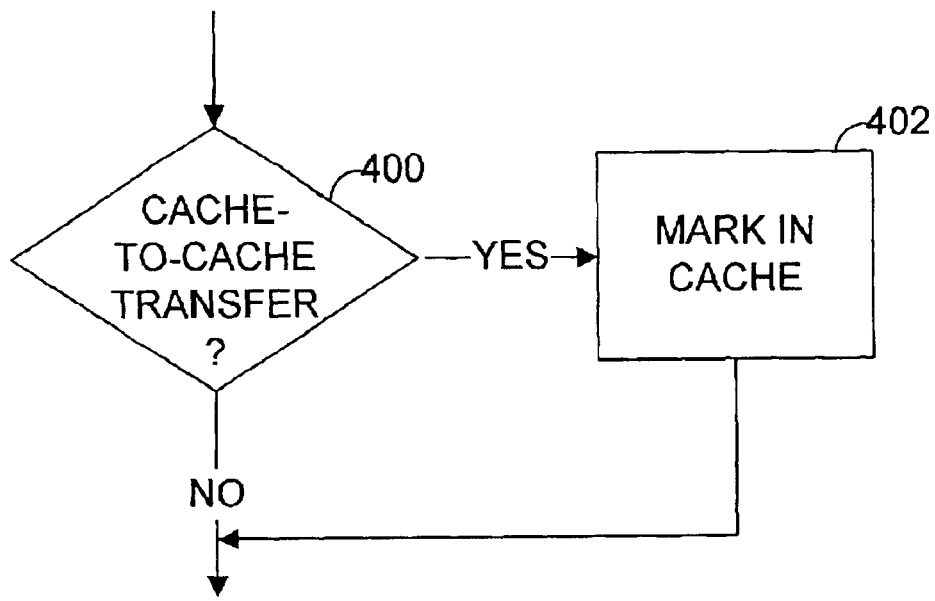
FIGS. 4A, 4B, and 4C are flow charts of example event driven processes in accordance with the example system of FIG. 3.
Figure 4B:
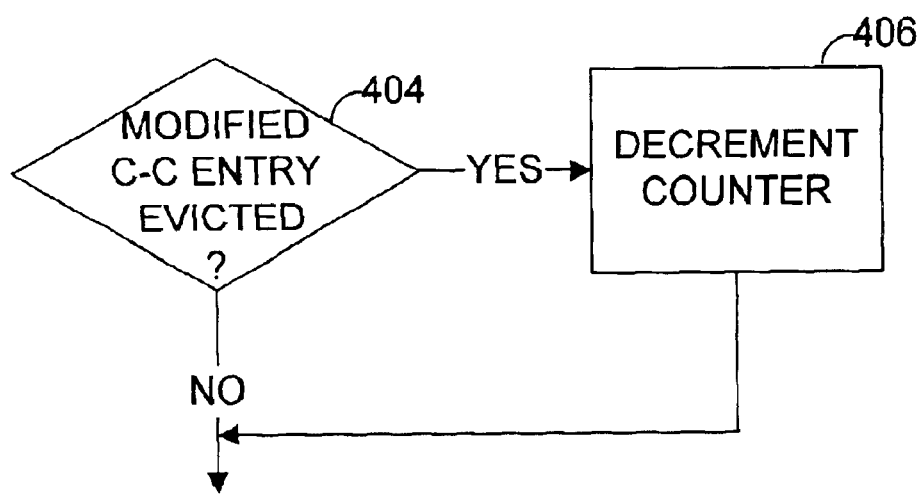
Figure 4C:
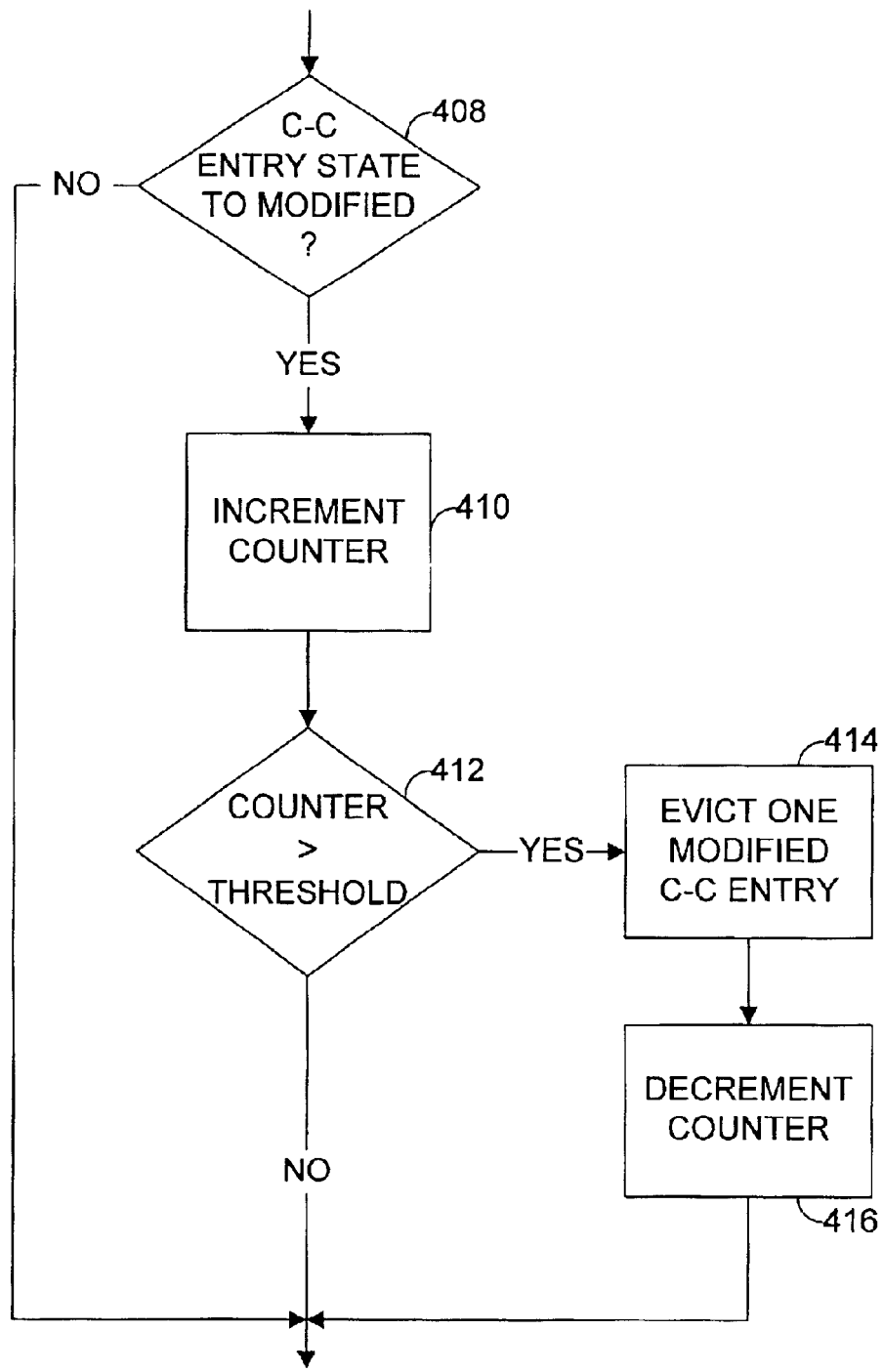

FIGS. 4A, 4B, and 4C illustrate example event driven processes for a system as in FIG. 3. The, processes of FIGS. 4A, 4B, and 4C are time independent. In FIG. 4A, if a entry is transferred from another cache (step 400), then the entry is marked in the cache as a cache-to-cache transfer entry (step 402). In FIG. 4B, if a modified cache-to-cache transfer entry is evicted (step 404), then the counter is decremented (step 406). In FIG. 4C, if a cache-to-cache transfer entry transitions to the Modified state (or equivalent) (step 408), then the counter is incremented (step 410). If the counter exceeds a threshold (step 412), then one modified cache-to-cache transfer entry is preemptively evicted (step 414), and the counter is decremented (step 416).

As an alternative, the system may count every dirty entry as in the first embodiment, but bias eviction in favor of cache-to-cache entries, as in the second example embodiment. That is, the system of FIGS. 1, 2A, and 2B may be used to count dirty entries and to determine when preemptive eviction is desired. In addition, cache-to-cache entries would be marked as discussed in conjunction with FIGS. 3, 4A, and 4B. Then, when a counter exceeds a threshold, at least one dirty entry marked as a cache-to-cache entry would be preemptively evicted.

In an ideal non-real-time system, an entry in the cache would be preemptively evicted just after the last use of the entry. If a modified entry remains in the cache too long, then there is an increased probability that another cache will request the entry, resulting in a cache-to-cache transfer. If entries are preemptively evicted too soon, then there is an increased probability that the evicting cache will have to re-read, from main memory, a line that was just evicted. Either of the just identified problems may be used as a performance measure. That is, a first example of a performance measure is to measure the rate of cache-to-cache transfers. A second example of a performance measure is to measure the rate of reuse, the rate at which entries are evicted from a cache but that are soon needed again by a processor. Either performance measure, or both, may be used, and the count threshold for preemptive eviction may be dynamically varied to optimize one or both performance measures. If only the rate of reuse is used, the operating system may start with a high threshold, and then reduce the threshold until the rate of reuse of evicted lines starts to increase. If only the rate of cache-to-cache transfers is used, the operating system may start with a low threshold, and then increase the threshold until the rate of cache-to-cache transfers starts to increase. If both performance measures are used, there may be a range where the threshold does not cause excessive reuse or excessive cache-to-cache transfers. Alternatively, if both performance measures result in a continuous change of performance, the counter threshold may be set to a value corresponding to the intersection of two curves: (a) reuse rate versus counter threshold, and (b) cache-to-cache transfer rate versus counter threshold.

Figure 5:
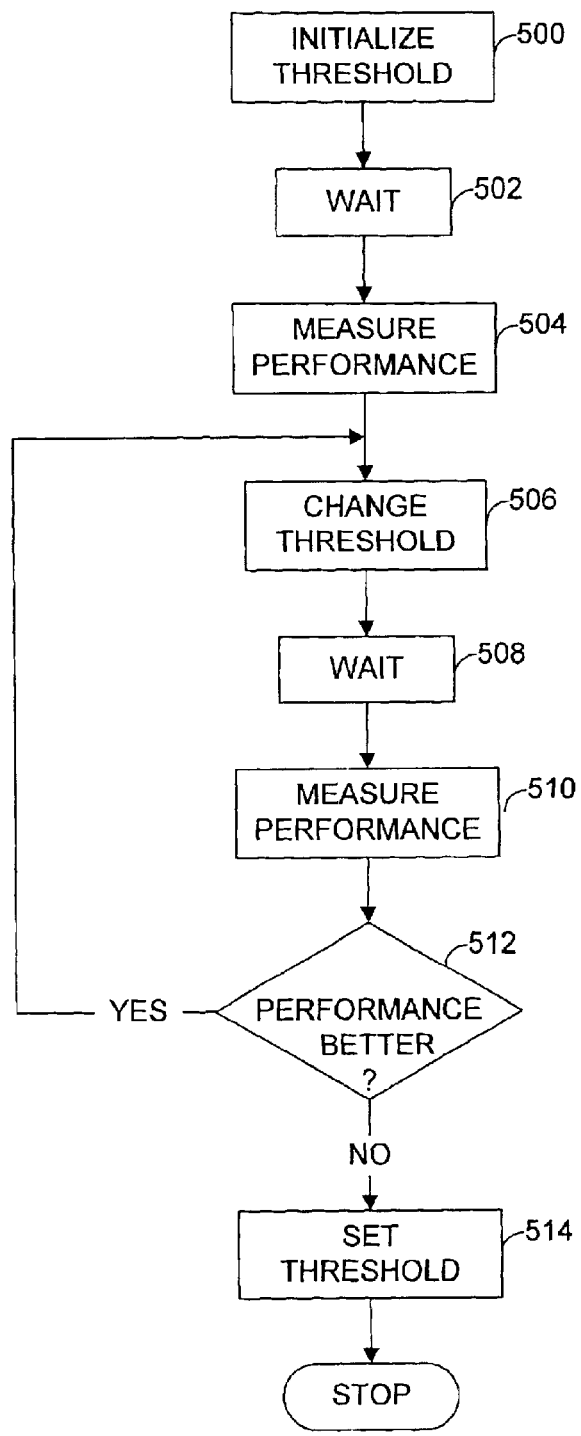
FIG. 5 is a flow chart of an example method to optimize a value of a threshold illustrated in FIGS. 2B and 4C.

FIG. 5 illustrates one example method to optimize performance, given a particular software application or set of software applications, and a cache memory that can detect stale lines based on a counter threshold. Other performance measures and optimization techniques may be used. In FIG. 5, at step 500, a counter threshold variable is initialized. After a wait period 502, an initial performance measure is determined at step 504. At step 506, the counter threshold value is changed. After a wait period 508, the performance parameter is measured at step 510. The system waits at steps 502 and 508 to let the computer system operate for a while using a particular value of the counter threshold. The counter threshold value of steps 500 and 506 is a counter threshold value used to identify stale lines. An example of the counter threshold variable is FIG. 2B, step 208, and FIG. 4C, step 412. At step 512, if the measured performance parameter is better than the previous measurement (or initial value), then the counter threshold is changed (step 506) and the process is repeated. If at step 512 the performance is worse than the previous measurement, then at step 514 the counter threshold to set at the value that optimizes performance, for example the value used for the previous performance measurement. As discussed further below, preferably, the initial value of the counter threshold (step 500) is one that ensures that performance will initially improve as determined at step 512. The steps may be repeated so that average values can be used to reduce noise. Alternatively, performance versus the value of the counter threshold may be analyzed as a function and an optimal value of the counter threshold may be derived from the function.

Figure 6:
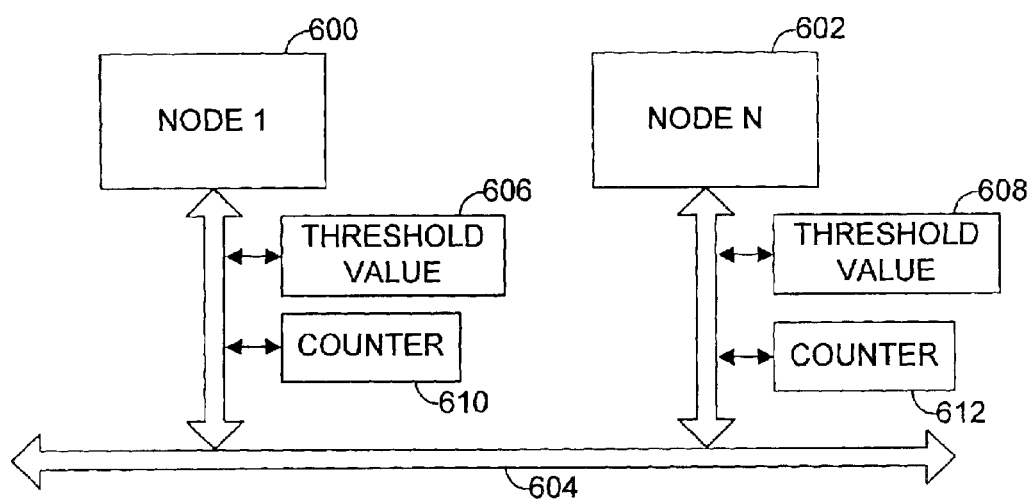
FIG. 6 is a block diagram of an example cache memory system that includes an example embodiment for implementing a first performance measure in accordance with the invention.

FIG. 6 illustrates an example computer system that includes a counter threshold value to determine when to preemptively evict cache entries, with adjustment of the counter threshold value to optimize performance, using cache-to-cache transfer rate for a performance measurement. In FIG. 6, two of N nodes (600 and 602) are interconnected by a bus (or switch, or fabric) 604. Each node may contain multiple processors, multiple cache memories, and main memory. In particular, each node may contain a cache system as illustrated in FIG. 1 or FIG. 3. The following discussion assumes that the system in FIG. 6 includes a signal that indicates a cache-to-cache transfer, such as signal "HITM#" discussed in conjunction with FIG. 3. The system in FIG. 6 measures the rate of cache-to-cache transfers for each node. In particular, a counter 610 counts each occurrence of the signal indicating a cache-to-cache transfer, in response to a request from node 600, over a predetermined time period, to determine a rate of cache-to-cache transfers to node 600. Note, that counter 610, which counts cache-to-cache transfers, is in addition to counter 110 in FIG. 1, or counter 310 in FIG. 3. Each node includes a system that includes a counter used to determine when dirty lines should be preemptively evicted, which in turn uses a threshold value expressly illustrated in FIG. 6 by threshold values 606 and 608. These threshold values are illustrated separately to facilitate discussion, and may simply be a value in a register in a processor in the corresponding node, or a value stored as part of a cache, for use in determining when to preemptively evict an entry. For example, the threshold values 606 and 608 may correspond to the threshold values indicated in FIG. 2B, step 208, and FIG. 4C, step 412. As illustrated in FIG. 5, a processor in a node in FIG. 6 monitors the rate of cache-to-cache transfers as a performance measure, and adjusts the counter threshold value (606 or 608) to a value that is less than a value that causes an increase in the rate of cache-to-cache transfers. As one example, the threshold value may start as a small value, and then may be increased until the rate of cache-to-cache transfers starts to increase. The value actually used will preferably be less than the value that causes cache-to-cache transfers to increase.

Figure 7:
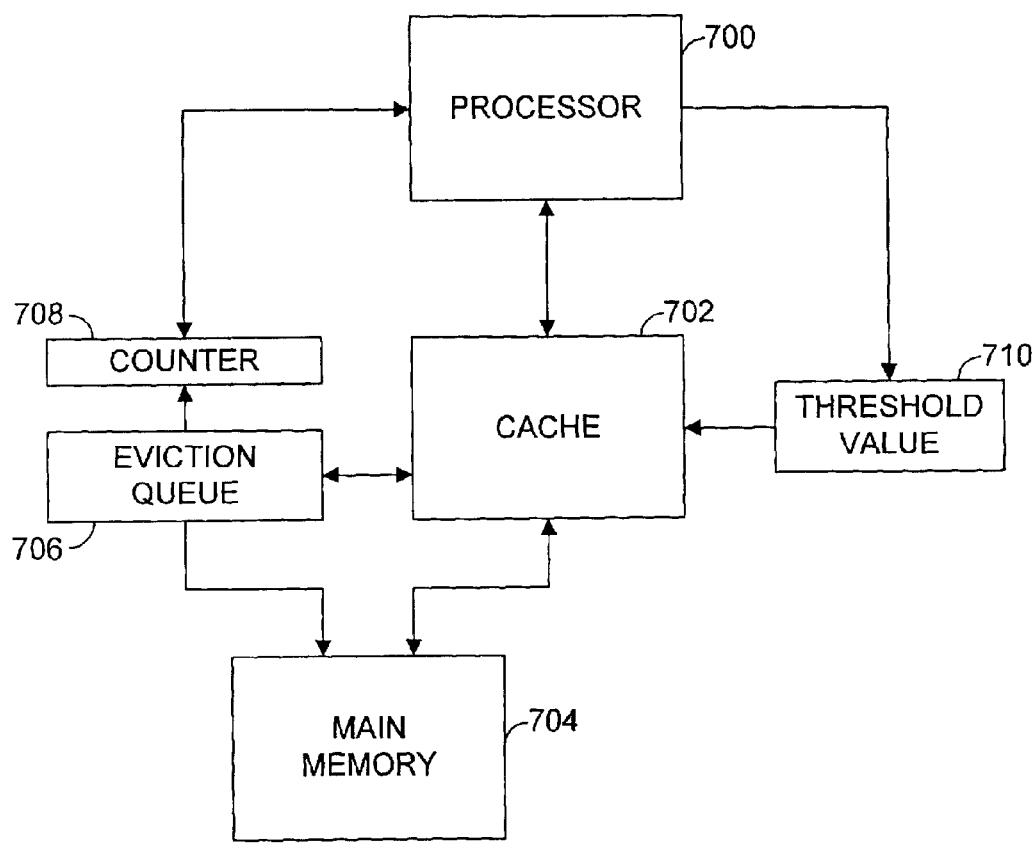
FIG. 7 is a block diagram of an example cache memory system that includes an example embodiment for implementing a second performance measure in accordance with the invention.

FIG. 7 illustrates an example computer system that includes counting dirty lines, with adjustment of the threshold used to determine when to preemptively evict a line to optimize performance, using reuse rate for a performance measurement. In FIG. 7, a processor 700 has an associated cache memory 702 and main memory 704. When lines are evicted from the cache 702, they are first placed into an eviction queue 706. Lines in the eviction queue 706 are then written to the main memory 704 after some delay time, depending on bus activity. If a line in the eviction queue 706 is requested by processor 700, it may be read directly from the eviction queue, or it may be written back to the cache 702, or both. The system in FIG. 7 also includes a counter 678 that counts the number of times lines are read out of the eviction queue 706, over a predetermined time period. The counter 708 may be reset by the processor 700, and the value of the counter may be read by the processor 700. FIG. 7 also illustrates a threshold value 710. This threshold value 710 is illustrated separately to facilitate discussion, and may simply be a value in a register in the processor 700 or a value stored as part of the cache 702 for use in determining when to preemptively evict cache entries.

Assume for illustration that cache 702 in FIG. 7 is a cache hierarchy as in FIG. 1 implementing processes as illustrated in FIGS. 2A, 2B. The threshold value 710 then corresponds to the threshold in FIG. 2B, step 208. In addition, threshold value 710 is controllable by the processor 700 as in FIG. 5, steps 500, 508, and 510. In the system of FIG. 7, the performance measure is the value of the counter 708. Applying the method of FIG. 5 to the system of FIG. 7, the threshold value 710 may be initialized to a high value. At a high value, the lines that are evicted may be very stale, and there is a low probability of reuse after eviction. Accordingly, the count in counter 708 should be relatively low. The value of the threshold 710 is then reduced. If the threshold value 710 is reduced without resulting in an increase in the count in counter 708, then the probability of cache-to-cache transfers is being decreased without causing eviction of lines that need to be reused. Eventually, the value of the threshold 710 will be reduced to a value at which the value of the counter 708 starts to increase. At that point, performance may decrease because lines are being prematurely evicted from the cache. At that point, the threshold value may be set to a slightly higher value, and then remain constant. If the application software or set of applications changes, or if the system changes, the process may be repeated.

From the above, cache-to-cache transfers may be reduced by addition of a counter to count the total number of dirty lines in a cache, and evicting at least one dirty line when the counter exceeds a threshold. Thrashing may be reduced by addition of a counter, and a state bit for each entry (or set of entries), and evicting a dirty transferred line when the counter exceeds a threshold. For any of the alternative embodiments, the threshold may be dynamically adjusted to optimize performance.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of improving performance of a computer system, comprising:
   (a) specifying a threshold;
   (b) determining the number of modified entries in a cache memory;
   (c) evicting, from the cache memory, at least one of the modified entries, when the number of modified entries in the cache memory exceeds the threshold;
   (d) measuring the rate of cache-to-cache transfers;
   (e) changing the value of the threshold;
   (f) repeating steps (b) and (c); and
   (g) determining whether the rate of cache-to-cache transfers has changed.

2. A method of improving performance of a computer system, comprising:
   (a) specifying a threshold;
   (b) determining the number of modified entries in a cache memory;
   (c) evicting, from the cache memory, at least one of the modified entries, when the number of modified entries in the cache memory exceeds the threshold;
   (d) measuring how many evicted entries are accessed during a predetermined time span;
   (e) changing the value of the threshold;
   (f) repeating steps (b) and (c); and
   (g) determining whether the number of evicted entries that have been accessed during the predetermined time span has changed.

* * * * *